United States Patent
Takasuka et al.

(10) Patent No.: US 6,728,035 B2
(45) Date of Patent: Apr. 27, 2004

(54) OPTICAL DEVICE WITH DIFFRACTION GRATING HAVING PLURAL GRATING REGIONS

(75) Inventors: Shoichi Takasuka, Osaka (JP); Shinichi Ijima, Osaka (JP); Hideyuki Nakanishi, Shiga (JP); Akio Yoshikawa, Kyoto (JP); Naoki Nakanishi, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 88 days.

(21) Appl. No.: 10/251,471

(22) Filed: Sep. 20, 2002

(65) Prior Publication Data

US 2003/0016448 A1 Jan. 23, 2003

Related U.S. Application Data

(62) Division of application No. 09/557,711, filed on Apr. 25, 2000, now Pat. No. 6,501,601.

(30) Foreign Application Priority Data

Apr. 28, 1999 (JP) ............................................. 11-122709
Apr. 24, 2000 (JP) ........................................ 2000-122877

(51) Int. Cl.$^7$ .............................. G02B 5/18; G11B 7/12
(52) U.S. Cl. .................. 359/569; 359/566; 369/112.04; 369/112.07; 369/112.12
(58) Field of Search ....................... 369/112.04, 112.05, 369/112.06, 112.07, 112.12; 359/566, 569, 573, 575

(56) References Cited

U.S. PATENT DOCUMENTS

| | | | | |
|---|---|---|---|---|
| 5,111,449 A | * | 5/1992 | Kurata | ..................... 369/44.37 |
| 5,235,583 A | | 8/1993 | Jongenelis et al. | |
| 5,391,865 A | | 2/1995 | Kurata et al. | |
| 5,475,670 A | * | 12/1995 | Hamada | ..................... 369/112 |
| 5,652,744 A | * | 7/1997 | Freeman | ..................... 369/109 |
| 5,708,644 A | | 1/1998 | Hasegawa | |
| 5,727,009 A | | 3/1998 | Tajiri et al. | |
| 5,815,293 A | | 9/1998 | Komma et al. | |
| 5,835,471 A | * | 11/1998 | Miyamoto | ................... 365/109 |
| 5,905,707 A | * | 5/1999 | Ju | ............................... 369/109 |
| 6,094,308 A | * | 7/2000 | Katsuma | ..................... 359/569 |
| 6,192,020 B1 | | 2/2001 | Takasuka et al. | |

FOREIGN PATENT DOCUMENTS

| | | |
|---|---|---|
| EP | 0 582 059 A2 | 6/1993 |
| EP | 0 612 068 A2 | 8/1994 |
| EP | 0 617 420 | 9/1994 |

(List continued on next page.)

*Primary Examiner*—Drew A. Dunn
*Assistant Examiner*—Leo Boutsikaris
(74) *Attorney, Agent, or Firm*—Merchant & Gould, P.C.

(57) ABSTRACT

An optical device includes a light-emitting element for irradiating light onto an information recording medium, a diffraction grating for splitting light emitted from said light-emitting element into a plurality of beams, a focussing member for focussing the plurality of beams onto the information recording medium, a deflection member for deflecting the plurality of beams after they have been reflected from the information recording medium; and a photodetector for receiving the plurality of beams after they have been deflected by the deflection member. The diffraction grating has a first grating region and a second grating region, which have different diffraction efficiencies. The zero-order diffraction light in the first grating region is used as the main beam for reproducing the information signal, and the +1-order or −1-order diffraction light in the second grating regions is used as sub-beams for reproduction of the tracking error signal. Thus, the light amount of both the main beam and the sub-beams can be increased without increasing the light emission of the semiconductor laser element 1, and the S/N ratio of the main beam and the sub-beams can be enhanced.

11 Claims, 16 Drawing Sheets

FOREIGN PATENT DOCUMENTS

| | | |
|---|---|---|
| EP | 0 726 568 A2 | 2/1995 |
| EP | 0 936 604 A1 | 8/1999 |
| JP | 63-138625 | 9/1988 |
| JP | 64-53359 | 3/1989 |
| JP | 6-308309 | 11/1994 |
| JP | 6-325400 | 11/1994 |
| JP | 6-333251 | 12/1994 |
| JP | 7-302435 | 11/1995 |
| JP | 8-124204 | 5/1996 |
| JP | 8-339568 | 12/1996 |
| JP | 9-80211 | 3/1997 |
| JP | 9-167372 | 6/1997 |
| JP | 9-231604 | 9/1997 |
| JP | 9-306054 | 11/1997 |
| JP | 10-255309 | 9/1998 |
| JP | 11-031332 | 2/1999 |
| JP | 11-110781 | 4/1999 |
| JP | 11-110782 | 4/1999 |
| JP | 2000-11424 A | 1/2000 |
| WO | WO 98/19303 | 5/1998 |

\* cited by examiner

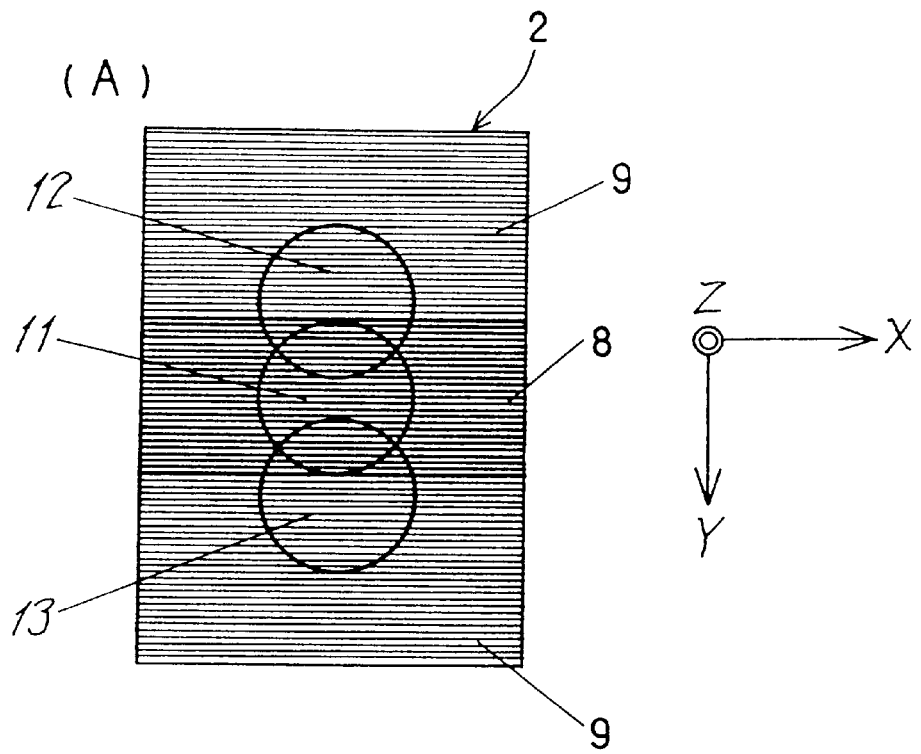
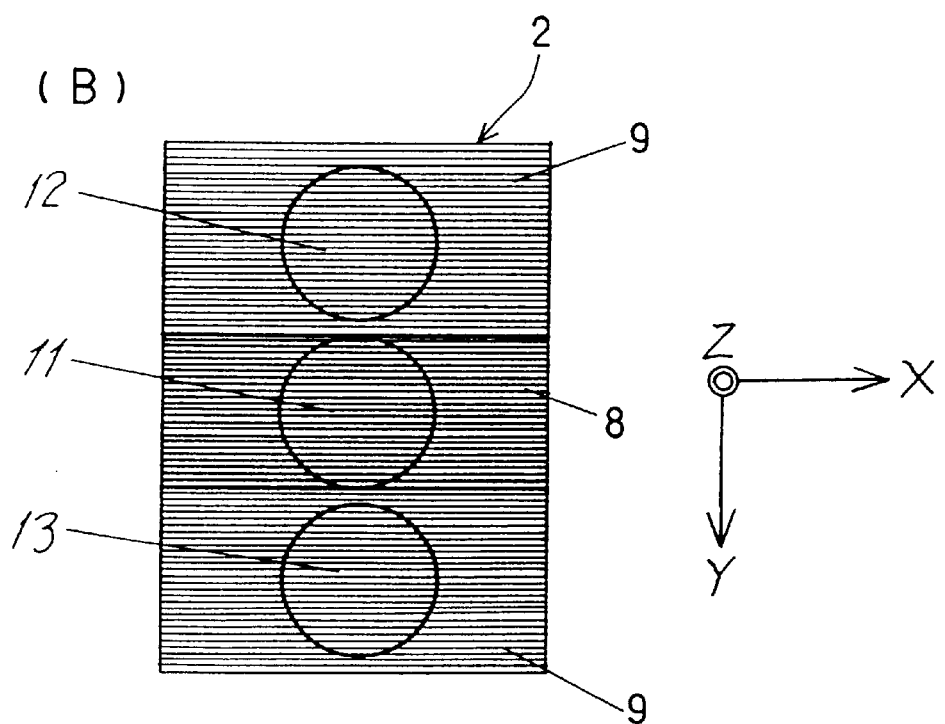
FIG. 1

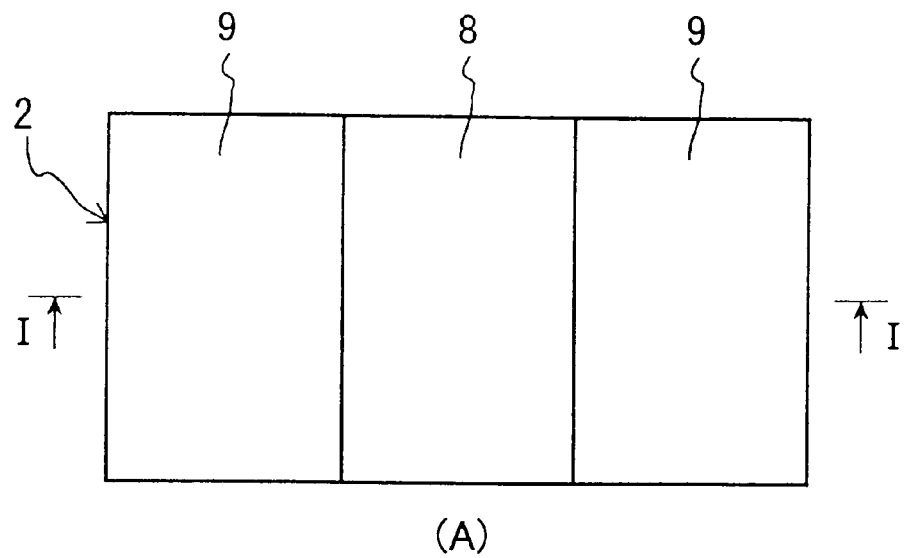
(A)
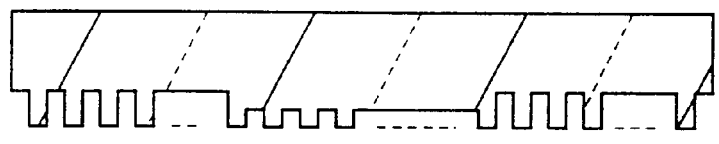
(B)
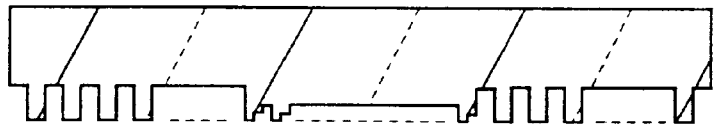
(C)
(D)
FIG. 2

OPTICAL DEVICE WITH DIFFRACTION GRATING HAVING PLURAL GRATING REGIONS

This application is a divisional application of application Ser. No. 09/557,711, filed on Apr. 25, 2000, now U.S. Pat. No. 6,501,601, which application is incorporated herein by reference.

BACKGROUND OF THE INVENTION

1. Field of the Invention

The present invention relates to an optical device.

2. Description of the Prior Art

First of all, the configuration and operation of a conventional optical device are explained with reference to the FIGS. 13 to 16.

FIG. 13 is a drawing showing the optical system of a conventional optical device. As shown in FIG. 13, a diffraction grating 2 for producing three light beams, a holographic element 3 serving as a deflection member, a collimator lens 4 serving as a focussing member, and an objective lens 5 serving as a focussing member are arranged in that order on the optical axis of a light beam emitted from a semiconductor laser element 1 serving as a light-emitting element.

An information recording medium 6 is arranged in the focussing plane of the objective lens 5. Photodetector groups 7 with a plurality of photodetectors for receiving light that has been deflected by the holographic element 3 are arranged on both sides of the semiconductor laser element 1.

As shown in FIG. 14, a parallel grating with constant pitch extending in the X-axis is formed on the diffraction grating 2. Moreover, a diffraction grating (not shown in the drawing) functioning as a lens is formed on the holographic element 3.

The following is an explanation of the propagation of light emitted from the semiconductor laser element 1. As shown in FIG. 13, when passing the diffracting grating 2, the light emitted from the semiconductor laser element 1 is diffracted by the diffraction grating 2 in the direction of the Y-axis, and split into three light bundles, namely a +1-order diffraction beam, a −1-order diffraction beam and a zero-order diffraction beam. It should be noted that, since the +1-order diffraction beam and the −1-order diffraction beam are diffracted in the Y-axis direction, that is in directions perpendicular to the plane of FIG. 13, they cannot be portrayed in distinction to the zero-order diffraction beam in this drawing. The zero-order diffraction beam is also referred to as the main beam, and is used to obtain the signal recorded on the information recording medium 6 and the focus error signal regarding the focus error between the optical device and the information recording medium 6. The ±1-order diffraction beams are referred to as sub-beams, and are used to obtain the tracking error signal. After passing the holographic element 3, these three light bundles are irradiated onto the collimator lens 4. The collimator lens 4 collimates the light beams into parallel light, and the objective lens 5 focuses the collimated light onto the information recording medium 6, where it is reflected back towards the objective lens 5.

Then, the light reflected by the information recording medium 6 propagates along the same path in the opposite direction, that is, through the objective lens 5, the collimator lens 4, and the holographic element 3, in that order. The light beams irradiated (again) onto the holographic element 3 are deflected in the X-axis direction, and enter the photodetector groups 7. The photodetector groups 7 receive the main beam and the sub-beams, and a calculating element (not shown in the drawings), which is connected to the photodetector group 7, calculates the signal recorded in the information recording medium 6, the focus error signal, and the tracking error signal.

The zero-order diffraction light in the region 11 of FIG. 14 enters the collimator lens 4, the +1-order diffraction light in the region 12 enters the collimator lens 4, and the −1-order diffraction light in the region 13 enters the collimator lens 4.

In this conventional optical device, the diffraction efficiency can be set to an appropriate value by adjusting the diffraction grating depth of the diffraction grating 2. Here, "diffraction grating depth" means the extent of the spatial modulation of the diffraction grating, and for a refractive index-type diffraction grating for example, it means the size of the spatial modulation of the refractive index.

FIG. 15 illustrates the diffraction efficiency of zero-order diffraction light as a function of the grating depth of the diffraction element 2 (line X) and the diffraction efficiency of ±1-order diffraction light as a function of the grating depth of the diffraction element 2 (line Y). As becomes clear from FIG. 15, an increase of the diffraction efficiency of ±1-order diffraction light leads to a decrease of the diffraction efficiency of zero-order diffraction light. This is a direct consequence of the law of the energy conservation.

Consequently, it was not possible to increase the light amount for the main beam and the sub-beams and to enhance the S/N ratio for both.

Moreover, conventional optical devices have the drawback that a tilt in the track direction of the information recording medium 6 causes an offset for the tracking error signal obtained by differential calculation from the sub-beam spots on the information recording medium 6. Such an offset may be caused by multiple reflections between the end face of the semiconductor laser element 1, the diffraction grating 2, the holographic element 3, and the information recording medium 6.

This mechanism is explained referring to the example shown in FIG. 16. The orientations of the X-axis, the Y-axis and the Z-axis in FIGS. 16A and 16B are the same as the respective orientations of the X-axis, the Y-axis and the Z-axis in FIG. 13. To keep the drawing simple, the semiconductor laser element 1, the diffraction grating 2, and the information recording medium 6 are the only structural elements shown in this drawing. The recording face of the information recording medium 6 is tilted with respect to the horizontal plane (indicated by a dashed line) by an angle δ around the X-axis. In FIG. 16, points A and B denote points of the laser light irradiated onto the information recording medium 6, point C denotes the point of emission of the laser light, and point D denotes a point of light returning from the information recording medium 6 on the end face of the semiconductor laser 1.

As is shown in FIG. 16A, the light that is emitted from point C of the semiconductor laser element 1 is reflected at point B on the information recording medium 6, diffracted at the diffraction grating 2, and returns to point D at the end face of the semiconductor laser element 1. There, the light is reflected, passes the diffraction grating 2 again, and reaches point A at the information recording medium 6 (resulting in the light path 1: C→B →D→A). Reflected several times in this manner, the light may reach a photodetector group 7 (not shown in this drawing). As a result, a phase difference results, caused by the difference of the light path length of the light beam reaching the photodetector group 7 following the original path, and the two light beams may interfere with each other.

As is shown in FIG. 16B, the light emitted from the emission point C of the semiconductor laser element 1 is reflected at point A on the information recording medium 6, passes the diffraction grating 2, and returns to point D at the end face of the semiconductor laser element 1. There, the light is reflected, passes the diffraction grating 2 again, and reaches point A at the information recording medium 6 (resulting in the light path 2: C→A→D→A). Also in this case, the light, which has been reflected several times in this manner, may reach the photodetector group 7 (not shown in this drawing). As a result, a phase difference results, caused by the difference of the light path length of the light beam reaching the photodetector group 7 following the original path, and the two light beams may interfere with each other.

The degree of this interference (i.e. the interference strength) changes with the phase difference, which depends on the tilt angle $\delta$ in the track direction of the information recording medium 6. Consequently, there is the problem that the signal strength based on the sub-beam spots varies, and there is an offset in the tracking error signal.

Similarly, interferences due to multiple reflections between the main beam and the sub-beams may occur, and lead to the problem that not only the S/N ratio of the reproduction signal but also the S/N ratio of the tracking error signal decreases.

SUMMARY OF THE INVENTION

It is an object of the present invention to provide an optical element, wherein the light amount of both the main beam and the sub-beams can be increased without increasing the light emission of the semiconductor laser element 1, and the S/N ratio of the main beam and the sub-beams can be enhanced.

It is another object of the present invention to provide an optical device, wherein an offset of the tracking error signal is reduced by suppressing multiple reflections between the information recording medium and the optical components used for the optical device, and the S/N ratio of the reproduction signal or the tracking error signal is increased by suppressing interference between the main beam and sub-beams.

An optical device in accordance with the present invention comprises:

a light-emitting element;

a diffraction grating for splitting light emitted from said light-emitting element into a plurality of beams, the diffraction grating comprising a first grating region and a second grating region with a diffraction efficiency that is different from a diffraction efficiency of the first grating region; and a focussing member for focussing light that has passed through the diffraction grating.

In the diffraction grating in the optical device of the present invention, the diffraction efficiency of the first grating region for transmitting the main beam is independent from the diffraction efficiency of the second grating region for transmitting a sub-beam, which increases the light utilization efficiency.

Moreover, by setting the diffraction efficiency of the first and the second grating region such that the diffraction efficiency of ±1-order diffraction light of the first grating region for transmitting the main beam is lower than the diffraction efficiency of ±1-order diffraction light of the second grating region for transmitting the sub-beams, the diffraction grating in the optical device of the present invention can suppress multiple reflections between the information recording medium and the optical components used in the optical device. As a result, the offset of the tracking error signal is reduced. Moreover, interference between the main beam and the sub-beams can be suppressed. The synergy of this effect and the above-noted effect of increasing the light utilization efficiency enhances the S/N ratio of the reproduction signal and the tracking error signal even more.

BRIEF DESCRIPTION OF THE DRAWINGS

FIGS. 1A and 1B show the diffraction gratings of optical devices in accordance with a first embodiment of the present invention.

FIG. 2A is a top view of another example of a diffraction grating of an optical device in accordance with the first embodiment of the present invention. FIGS. 2B–D are cross-sections taken along I—I in FIG. 2A viewed in the arrow direction.

DESCRIPTION OF THE PREFERRED EMBODIMENTS

Figure 3:
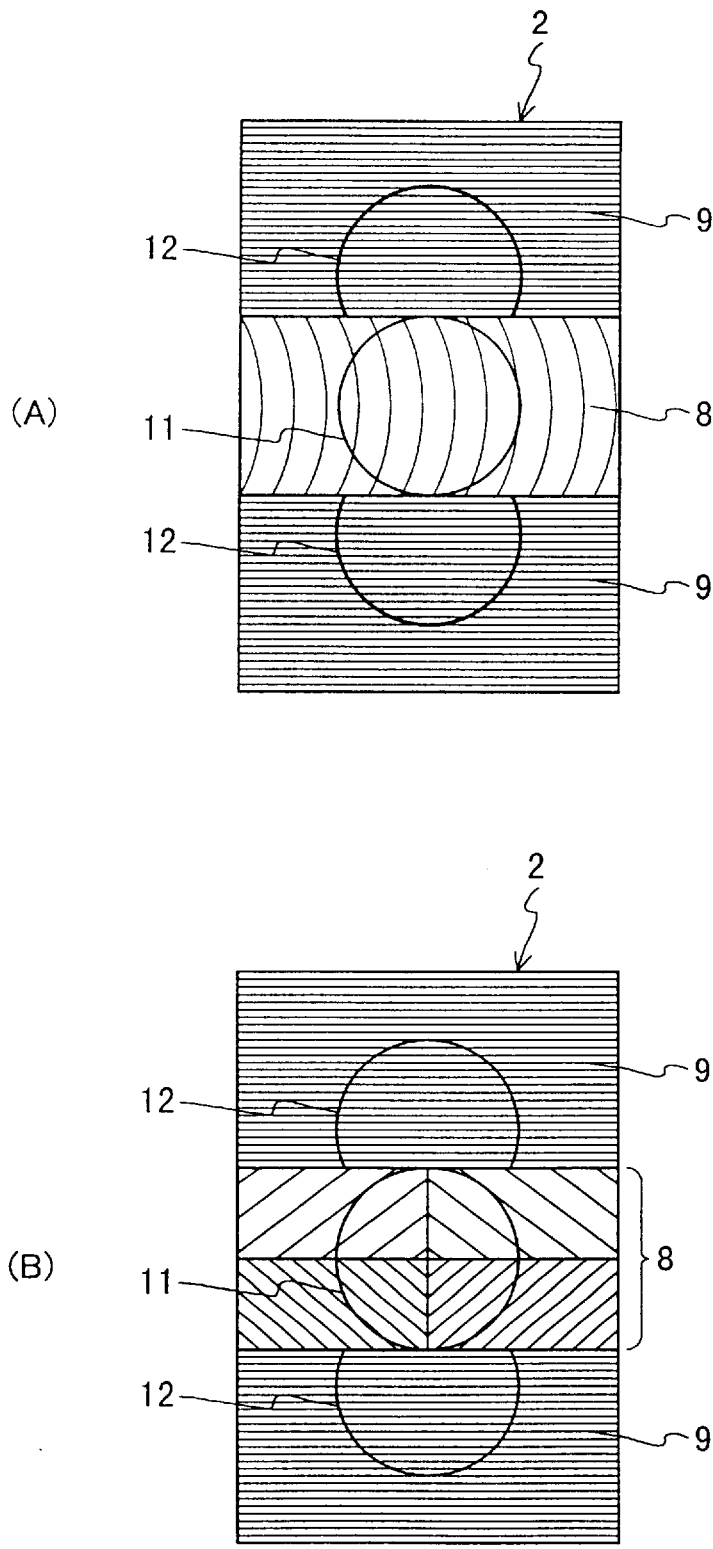
FIGS. 3A and 3B show other examples of the diffraction gratings of optical devices in accordance with the first embodiment of the present invention.

The following is a description of the preferred embodiments of the present invention, with reference to FIGS. 1 to 12.

First Embodiment

The following explains an optical device in a first embodiment of the present invention.

The configuration of the optical device in the first embodiment of the present invention is basically the same as that of the conventional optical device illustrated in FIG. 13, but the structure of the diffraction grating 2 in the first embodiment of the present invention differs from the conventional one in the following aspects.

FIG. 1A is a top view of the diffraction grating 2 of the optical device in the first embodiment of the present invention. The orientations of the X-axis, the Y-axis and the Z-axis in FIG. 1 are the same as the respective orientations of the X-axis, the Y-axis and the Z-axis in FIG. 13. In FIG. 1A, the diffraction grating 2 has a stripe-shaped first grating region 8 parallel to the X-axis, and second grating regions 9 formed on both sides of the first grating region 8. The diffraction efficiency of the first grating region 8 is different from that of the second grating regions 9. The grating in the first grating region 8 and the grating in the second grating region 9 are formed parallel to the stripe-shaped first grating region 8, that is, parallel to the X-axis. The pitch of the grating in the first grating region 8 is the same as the pitch of the grating in the second grating regions 9.

The zero-order diffraction light in the region 11 in FIG. 1A enters the collimator lens 4, the +1-order diffraction light in the region 12 enters the collimator lens 4, and the −1-order diffraction light in the region 13 enters the collimator lens 4.

Figure 13:
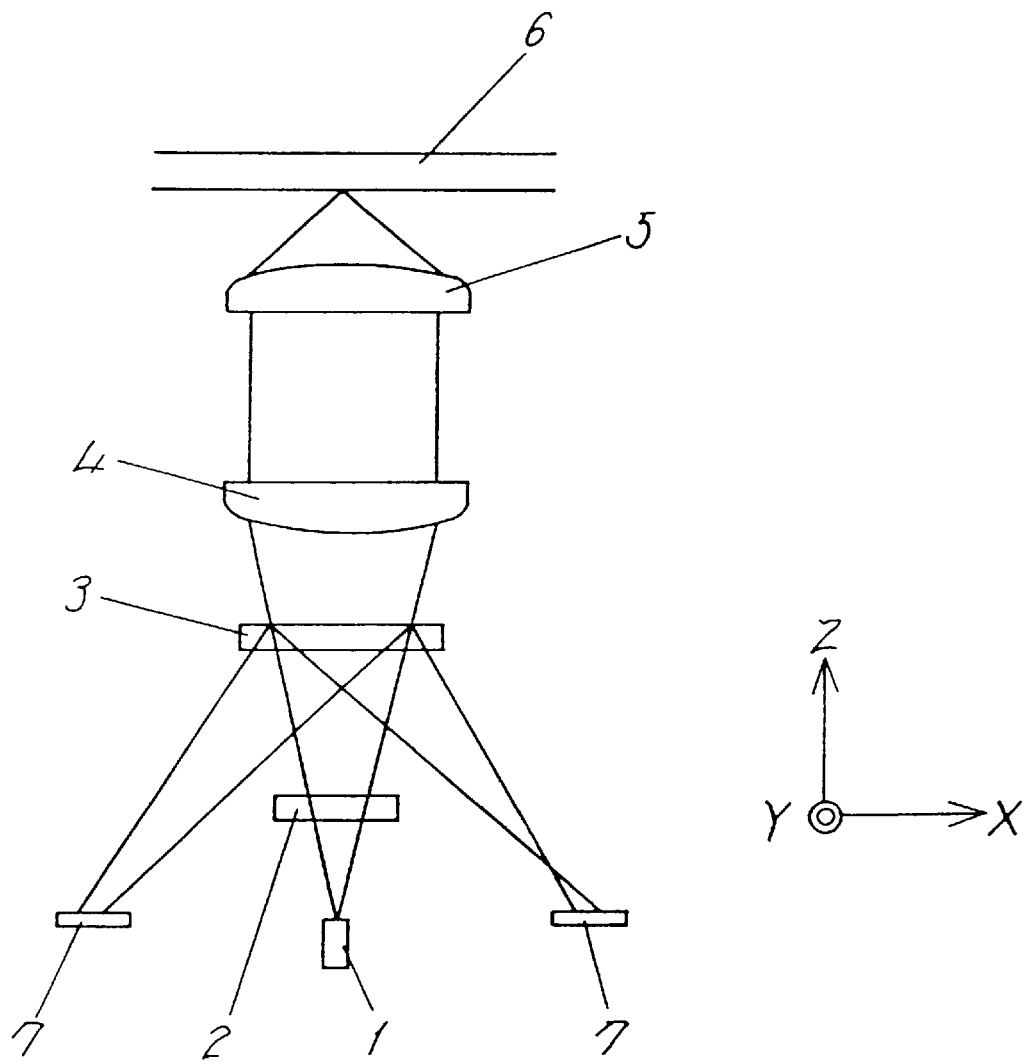
FIG. 13 shows an optical device in accordance with the present invention and the prior art.
Figure 14:
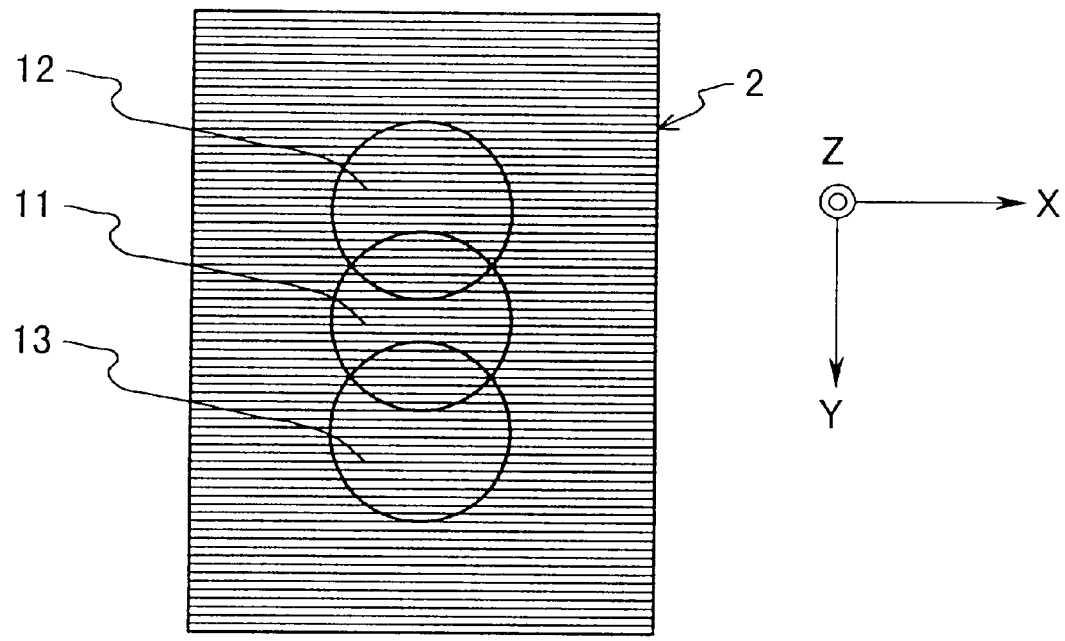
FIG. 14 shows a diffraction grating in an optical device of the prior art.
Figure 15:
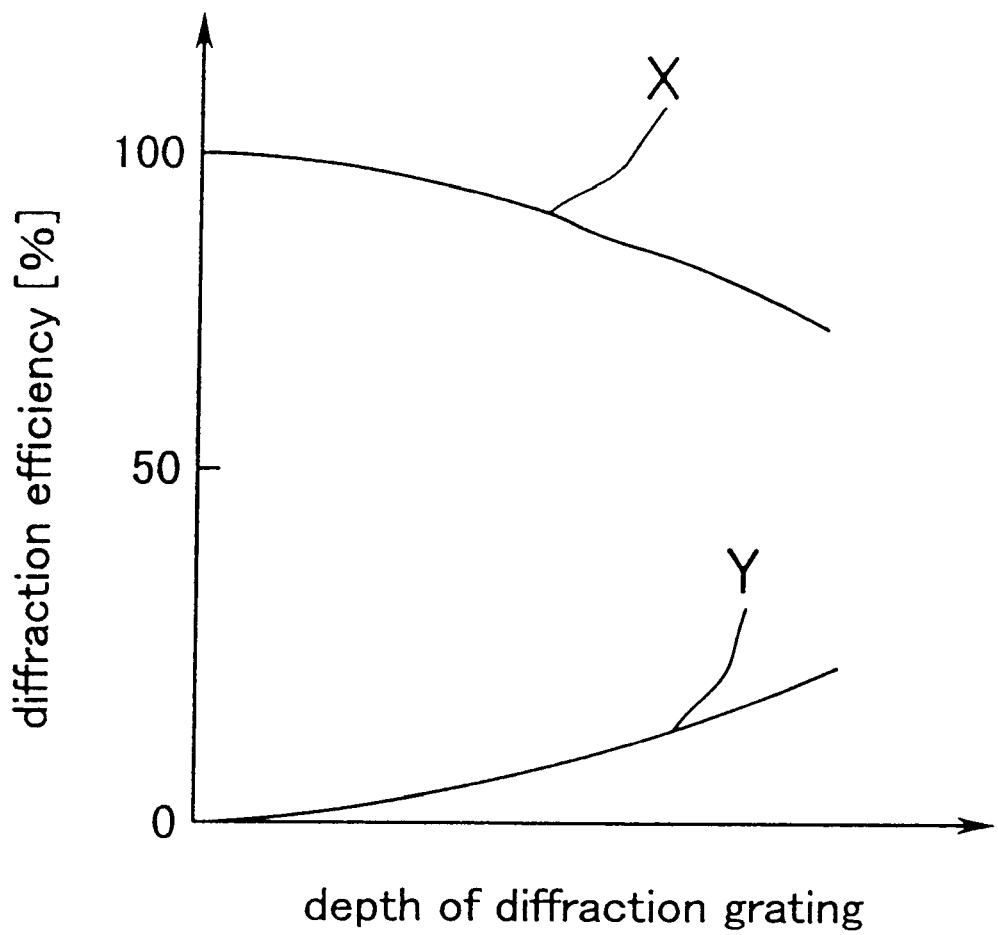
FIG. 15 shows the diffraction efficiency as a function of the grating depth in a diffraction grating of the prior art.

The grating element 2 is arranged so that the optical axis of the laser light emitted from the semiconductor laser element 1 in FIG. 13 passes through a center portion of the first grating region 8, so that the zero-order diffraction light passing through the first grating region 8 is used as the main beam, and the ±1-order diffraction light passing through the second grating regions 9 is used as the sub-beams. Thus, the diffraction grating 2 of the optical device in the first embodiment is divided into a first grating region 8 for generating a main beam and second grating regions 9 for generating sub-beams, so that by individually adjusting the grating depth in these different regions, the diffraction efficiency for the zero-order diffraction light and the ±1-order diffraction light can be set individually. Therefore, the diffraction efficiency of the zero-order diffraction light in the first grating region 8 can be raised without influencing the intensity of the ±1-order diffraction light generated in the second grating regions 9, and conversely, the diffraction efficiency of the ±1-order diffraction light in the second grating region 9 can be raised without influencing the intensity of the zero-order diffraction light generated in the first grating regions 8.

Figure 16:
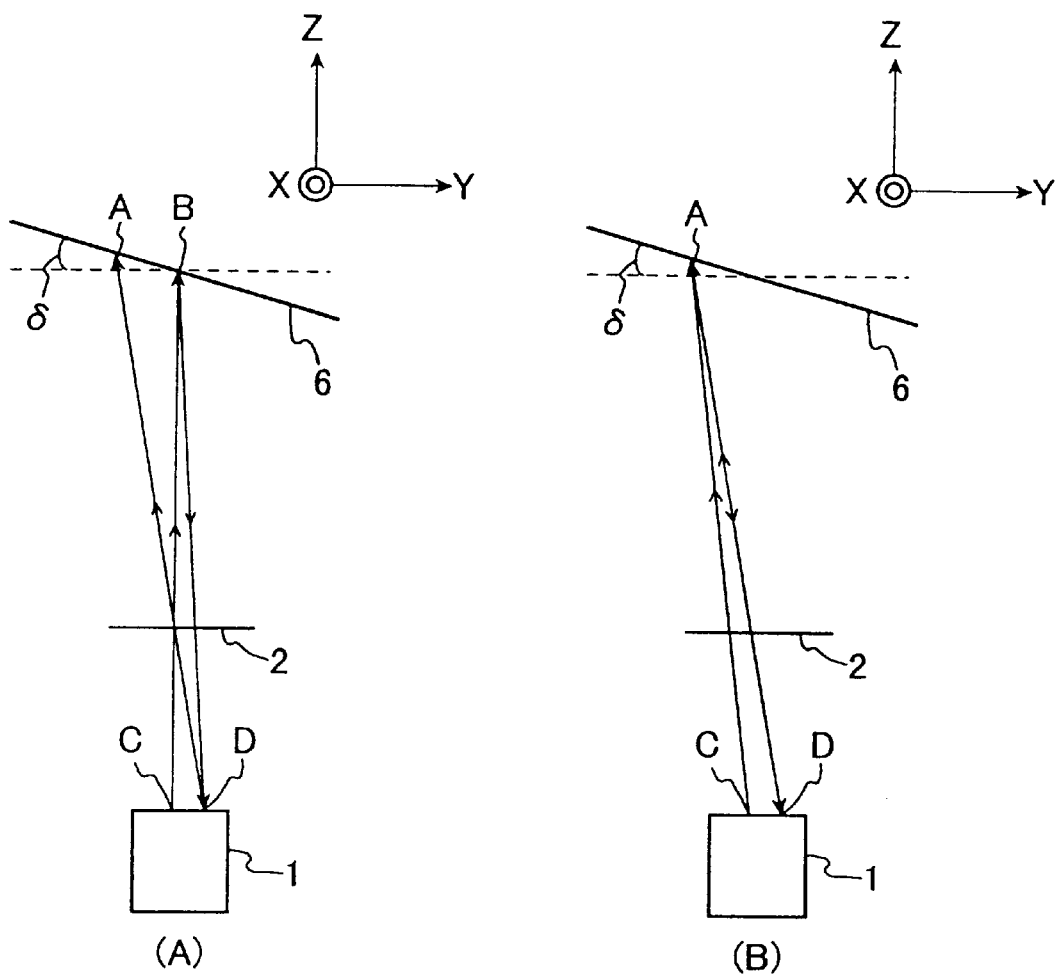
FIG. 16 illustrates multiple reflections between an information recording medium and the optical device.

For this reason, with the optical device in the first embodiment, in order to increase the intensity of the zero-order diffraction light generated in the first grating region 8, and to increase the intensity of the ±1-order diffraction light generated in the second grating regions 9, the diffraction efficiency of the zero-order light in the first grating region 8 is set to be larger than the diffraction efficiency of the zero-order diffraction light in the second grating regions 9. Thus, the light utilization efficiency can be increased. Moreover, the light amount of both the main beam and the sub-beams can be increased and their S/N-ratio can be raised, without increasing the emission intensity of the semiconductor laser element 1 itself. This means that the ±1-order diffraction efficiency is decreased, because the zero-order diffraction efficiency of the first grating region 8 is increased. Consequently, influences due to multiple reflections along light path 1 (C→B→D→A) in FIG. 16A and light path 2 (C→A→D→A) in FIG. 16B are suppressed, so that interferences between the main beam and the sub-beam are diminished. Consequently, the synergy of this effect and the above-noted effect of increasing the light utilization efficiency enhances the S/N ratio of the reproduction signal and the tracking error signal. And for the same reason, an offset of the tracking error signal can be decreased.

The pitch of the grating in the first grating region 8 can be the same as the pitch in the second grating regions 9, or it can be different.

The first grating region 8 and the second grating region 9 also can be configured as shown in FIG. 2. FIG. 2A is a top view of the diffraction grating 2. FIGS. 2B–D are cross-sectional views in the arrow direction taken along I—I in FIG. 2A. In FIGS. 2B–D, the dotted lines indicate that the same shape repeats over and over.

The depth of the diffraction grating in the first grating region 8 can be different from the depth of the diffraction grating in the second grating region 9. For example, if the depth of the diffraction grating in the first grating region 8 is made smaller than the depth of the diffraction grating in the second grating region 9 as shown in FIG. 2B, then the diffraction efficiency of the zero-order diffraction light in the first grating region 8 is set to be larger than the diffraction efficiency of the zero-order diffraction light in the second grating region 9.

Moreover, a stepwise variation of the depth of the diffraction grating with a constant period in the first grating region 8 or the second grating region 9 is also possible. For example, if the depth of the diffraction gratings in the first grating region 8 varies stepwise, and the depth of the diffraction grating in the first grating region 8 is made smaller than the depth of the diffraction grating in the second grating region 9 as shown in FIG. 2C, then the diffraction efficiency of the zero-order diffraction light in the first grating region 8 is set to be larger than the diffraction efficiency of the zero-order diffraction light in the second grating region 9, which improves the light utilization efficiency. Furthermore, with a step-wise approximated blaze-shape, the occurrence of −1-order diffraction light can be suppressed. That is to say, the zero-order diffraction efficiency of the grating region 8 is enhanced even further, which not only increases the light utilization efficiency, but also improves the S/N ratio of the reproduction signal and the tracking error signal, because interferences between the main beam and the sub-beams are suppressed.

Moreover, if the diffraction grating in the first grating region 8 is a blazed grating (saw-tooth-shaped) as shown in FIG. 2D, then the S/N ratio of the reproduction signal and the tracking error signal is improved even further, because the occurrence of −1-order diffraction light can be suppressed completely.

Furthermore, the diffraction grating pattern of the first grating region 8 also can be different from the diffraction grating pattern of the second grating region 9. For example, if the diffraction grating in the first grating region 8 is curved as shown in FIG. 3A, then the light of the main beam returning from the information recording medium 6 can be focussed and diffracted to be guided towards a light-receiving element, and the reproduction signal can be detected. Moreover, the first grating region 8 also can be composed of a plurality of regions with diffraction gratings having different grating directions as shown in FIG. 3B.

It is also possible to make the first grating region 8 stripe-shaped, and tilt the direction of the diffraction grating of the second grating region 9 by a predetermined angle against the direction of the diffraction pitch of the first grating region 8. By doing so, the diffraction efficiency of the zero-order diffraction light in the first grating region 8 can be set to be larger than the diffraction efficiency of the zero-order diffraction light in the second grating region 9, and if, for example, a tracking error signal is detected with the three-beam method, then it becomes easy to realize an arrangement wherein the focus spots of the main beam and the sub-beams are separated by a distance of only ¼ the track pitch on the information recording medium 6.

This embodiment has been explained for the case that the region 12 and the region 13 overlap with the first grating region 8, as shown in FIG. 1A. However, if the optical system is designed so that the region 12 and the region 13 are formed completely inside the second grating regions 9, as shown in FIG. 1B, then the entire sub-beams pass through the second grating regions 9. Consequently, the intensity of the sub-beams is completely independent of the diffraction efficiency of the first grating region 8, so that the diffraction efficiency of the first grating region 8 can be set freely, without giving consideration to the intensity of the sub-beams.

Moreover, if the width of the first grating region 8 in the Y-axis direction is at least 2d tan(sin$^{-1}$(NA)), wherein d is the distance from the emission plane of the semiconductor laser element 1 to the diffraction grating 2, and NA is the numerical aperture of the collimator lens 4, then only the zero-order diffraction light passing through the first grating region 8 becomes the main beam. Consequently, the intensity of the main beam becomes completely independent of the diffraction efficiency of the second grating region 9, so that the diffraction efficiency of the first grating region 8 can be set freely without giving consideration to the intensity of the sub-beams.

This embodiment has been explained for the case of an optical device having an infinite optical system with a collimator lens 4 and an objective lens 5. However, the present invention can be applied equally to a finite optical system using only the objective lens 5.

Figure 4:
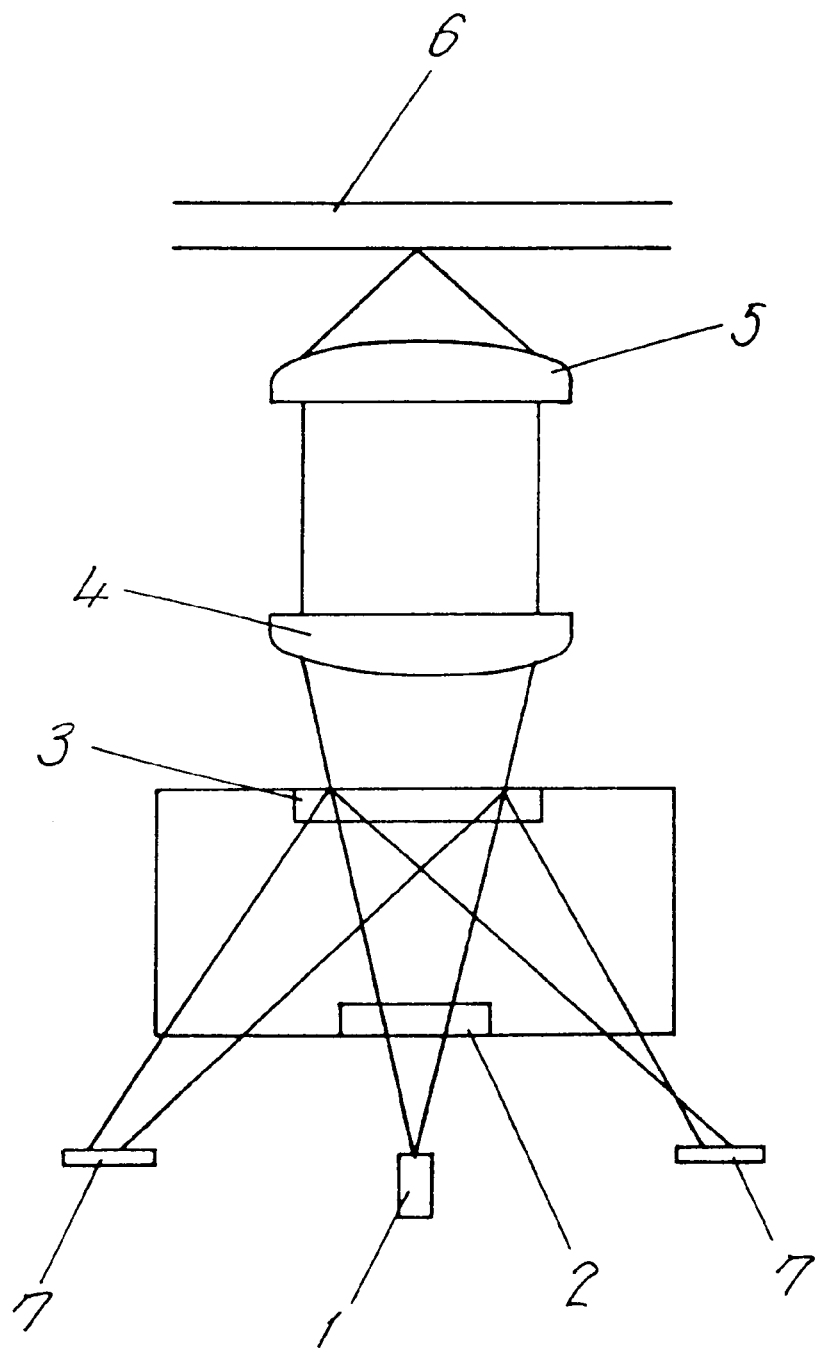
FIG. 4 shows an optical device in accordance with the first embodiment of the present invention.

If the diffraction grating 2 and the holographic element 3 are integrated into one component, as shown in FIG. 4, then the number of optical components can be reduced, and the optical device can be made smaller and thinner.

Figure 5:
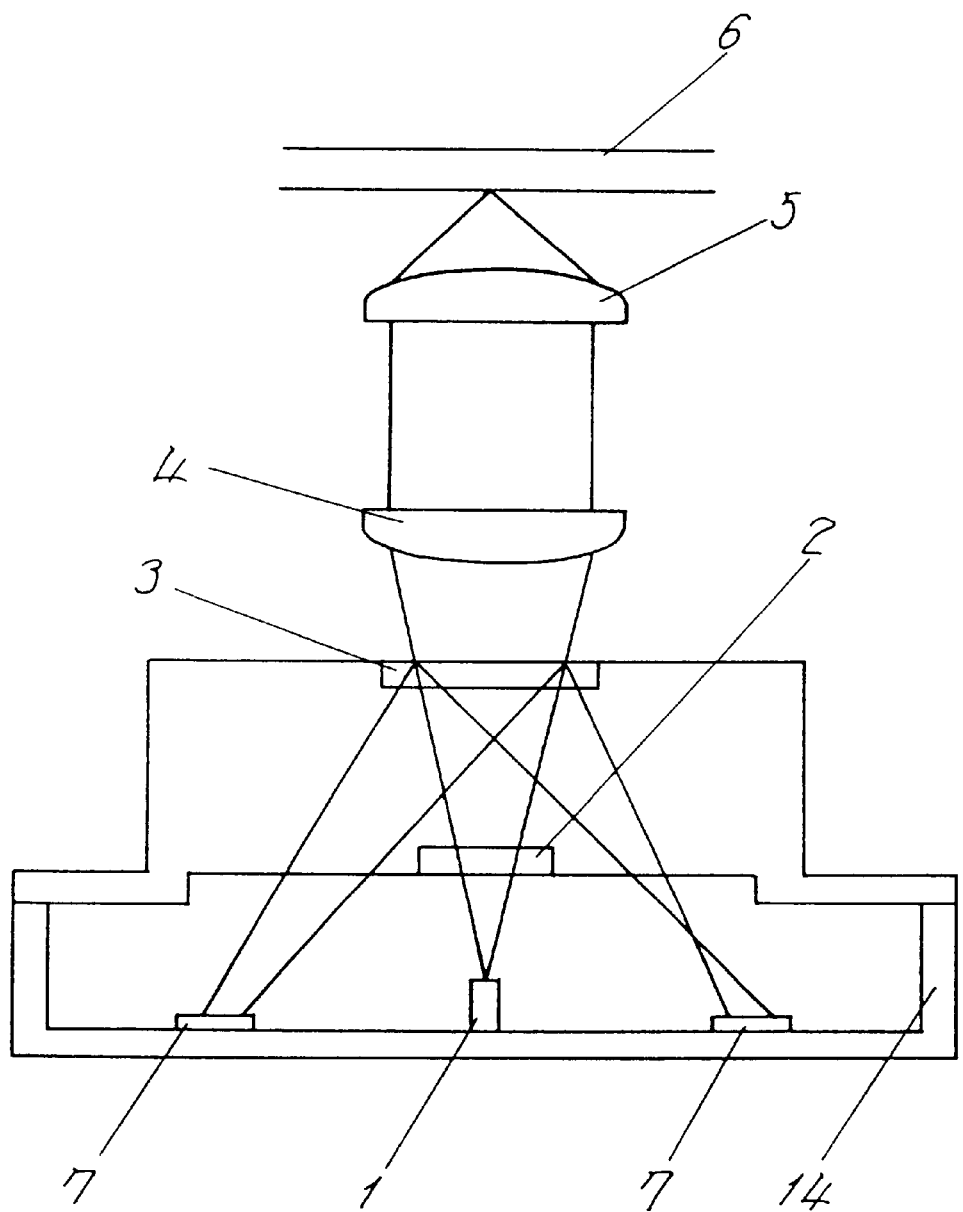
FIG. 5 shows an optical device in accordance with the first embodiment of the present invention.

If the semiconductor laser element 1 and the photodetector groups 7 are arranged in the same package 14, and this package 14 is sealed with an optical component, into which the diffraction grating 2 and the holographic element 3 are integrated, as shown in FIG. 5, then the optical system can be made smaller and thinner, while increasing the reliability of the optical device considerably.

Figure 6:
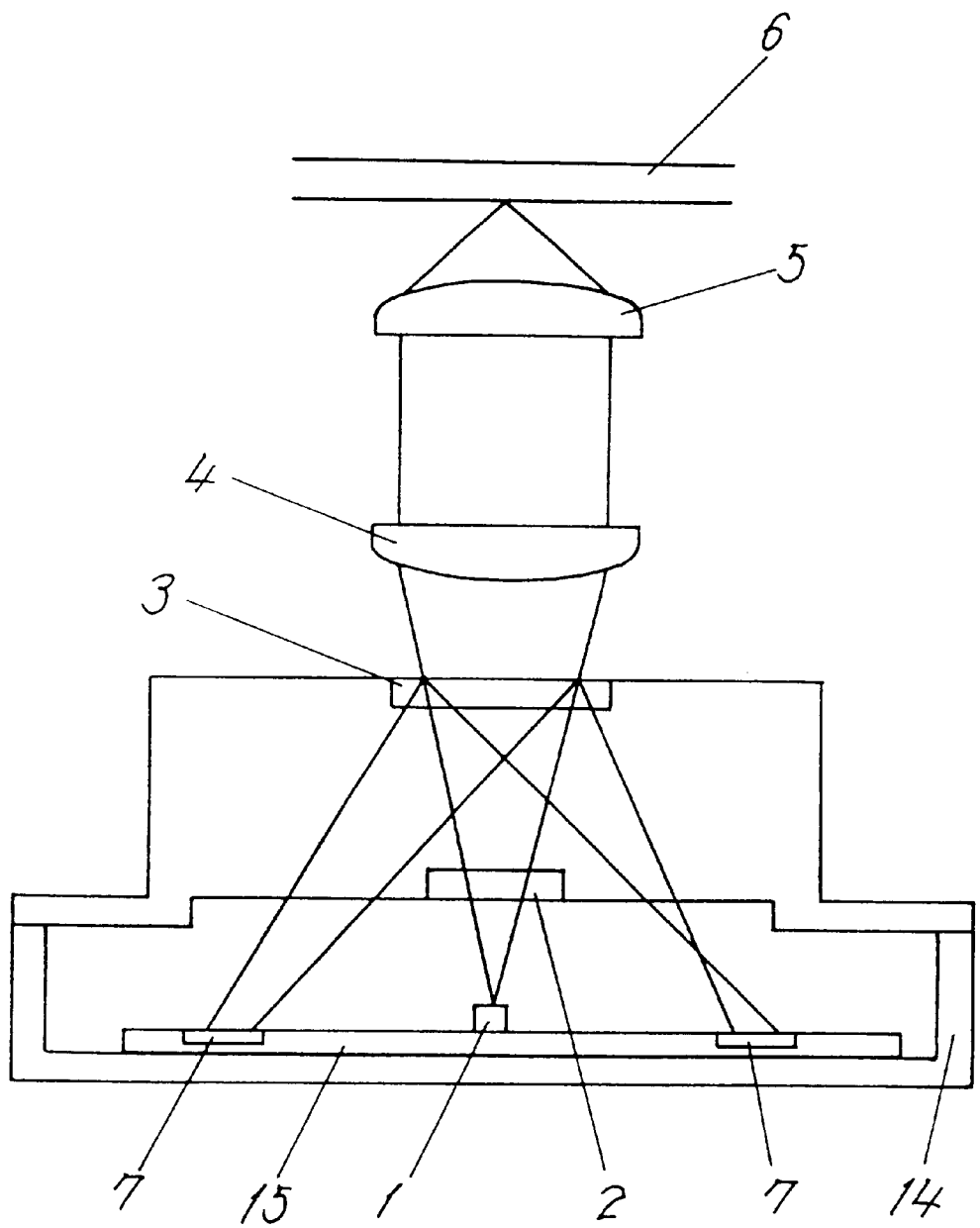
FIG. 6 shows an optical device in accordance with the first embodiment of the present invention.
Figure 7:
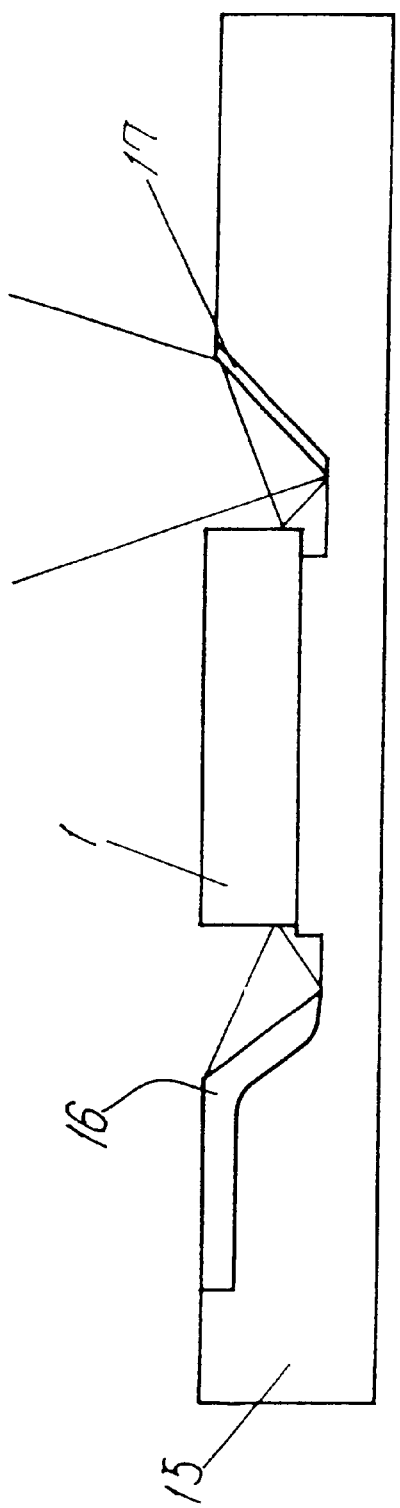
FIG. 7 shows an optical device in accordance with the first embodiment of the present invention.

Moreover, integrating the semiconductor laser element 1 and the photodetector groups 7 into one component on a silicon substrate 15, as shown in FIG. 6, makes the assembly easier than if separate elements are arranged inside the package 14. Moreover, using semiconductor micro-processing technology, it is possible to integrate on substrate 15 a circuit for current-voltage conversion and evaluation of the electric signals from the photodetector groups 7. This makes it possible to reduce noise caused by the wiring inside the optical device, so that an optical device with a better S/N ratio can be realized. This integration can be realized as a hybrid structure by bonding the chip to the semiconductor laser element 1, after forming all the photodetector groups 7 by semiconductor micro-processing technology on a silicon substrate 15. If the semiconductor laser element 1 is of the surface-emitting type, the emitting surface should be faced upward and chip-bonded. If the semiconductor laser element 1 is of the end face-emitting type, it is possible to form a concave portion in the substrate 15 by semiconductor micro-processing technology, as shown in FIG. 7, and to chip-bond the semiconductor laser element 1 into this portion.

If a micro-mirror 17 is formed by forming a face slant at an angle of 45° in this concave portion, and depositing a metal or a dielectric film on this face, then the light emitted from the semiconductor laser element 1 is reflected from the micro-mirror 17, so that the light can be guided in an upward direction.

And using semiconductor micro-processing technology, it is also possible to form a monitoring photodetector 16 for receiving the light emitted by the semiconductor laser element 1 from the side that is opposite to the micro-mirror 17, and adjusting the output of the semiconductor laser element 1. This configuration has the effect that the optical output of the semiconductor laser element 1 can be adjusted constantly to the optimal output, and waste of electric power due to excessive optical output can be avoided.

On the other hand, it is also possible to use semiconductor hetero-epitaxy to form a compound semiconductor layer (not shown in the drawings) monolithically on the silicon substrate 15, and to form the semiconductor laser element 1 and the photodetector groups 7 on the silicon substrate 15 or on the compound semiconductor layer. In this case, the semiconductor laser element 1 and the photodetector groups 7 can be integrated into one component without using the silicon substrate 15, and using only the compound semiconductor layer.

Figure 8:
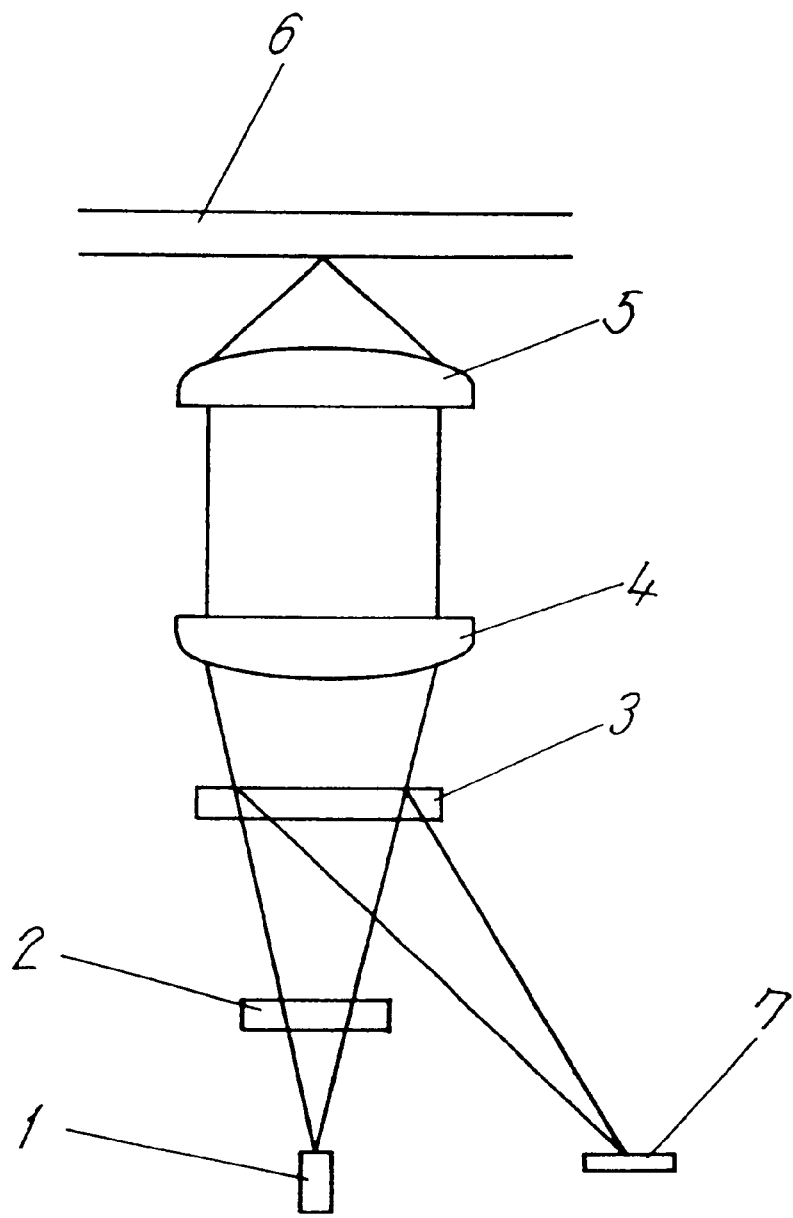
FIG. 8 shows an optical device in accordance with the first embodiment of the present invention.

Moreover, the present embodiment has been explained for an optical device in which both the +1-order diffraction light and the −1-order diffraction light of the holographic element 3 are used to detect the reproduction signal and the various servo signals. However, if only the +1-order diffraction light or the −1-order diffraction light of the holographic element 3 is used to detect the reproduction signal and the various servo signals as shown in FIG. 8, the number of photodetectors constituting the photodetector groups 7 can be reduced, which makes the optical device cheaper.

Figure 9:
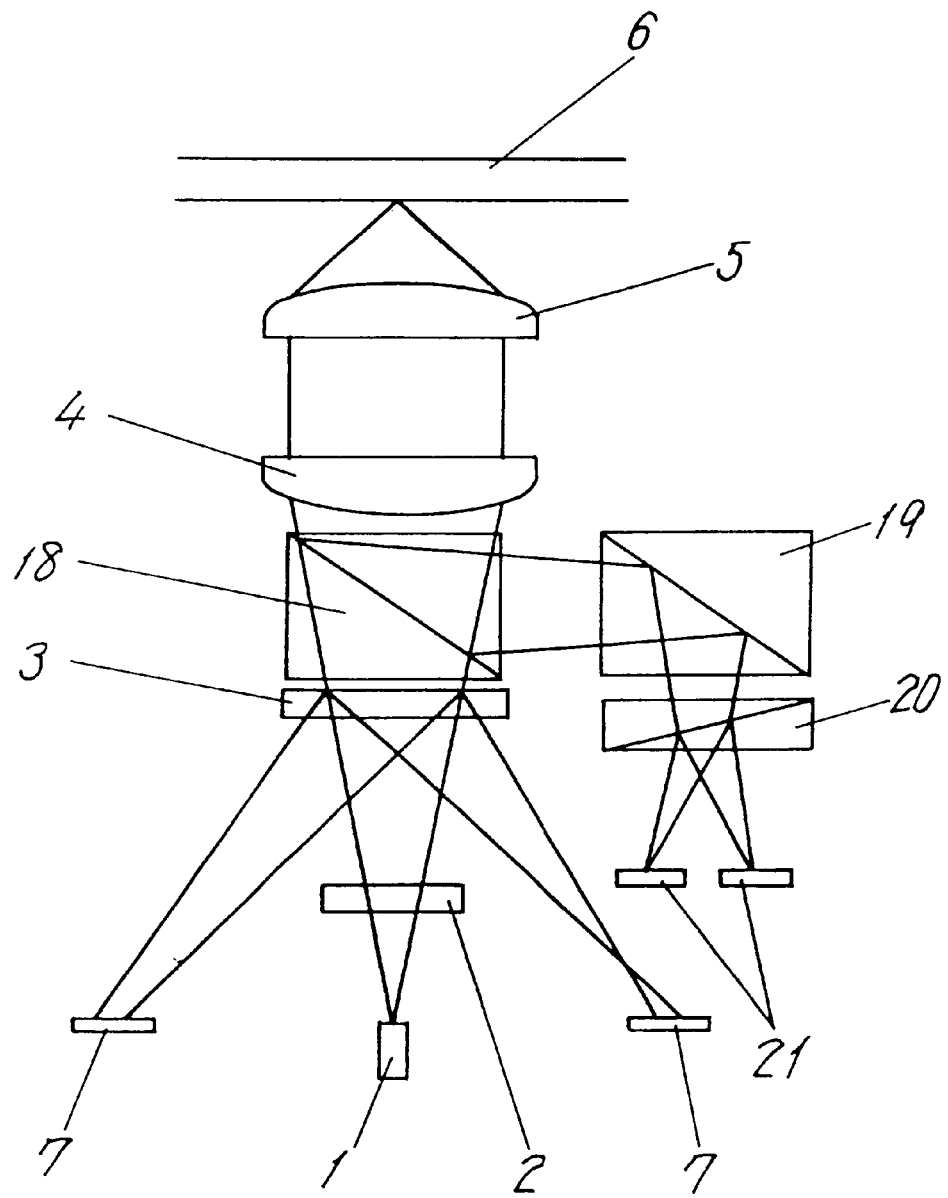
FIG. 9 shows an optical device in accordance with the first embodiment of the present invention.

Adding, as shown in FIG. 9, a polarization beam splitter 18, a reflector 19, a polarization separator 20 and a photodetector group 21 for polarization signal detection to the configuration of the optical device of FIG. 1 makes opto-magnetic signal detection possible. In FIG. 9, the light that is reflected from the information recording medium 6 and incident on the polarization beam splitter 18 is split up into a beam that travels towards the holographic element 3 and a beam that travels towards the reflector 19. The reflected light that has been split by the polarization beam splitter 18 and travels towards the holographic element 3 is diffracted and focussed by the holographic element 3 onto the photodetector group 7, and is used to calculate and/or detect the servo signal, as explained above.

On the other hand, the returning light that is split by the polarization beam splitter 18 and travels toward the reflector 19 is reflected by the reflector 19, polarized and separated into P-polarized light and S-polarized light by the polarization separator 20, and guided to the photodetector group 21 for polarization signal detection, whereupon the reproduction signal is calculated. Thus, the light utilization efficiency of optical devices for optomagnetic signal detection, which are often said to have an inferior light utilization efficiency, can be improved, which enables operation with a semiconductor laser element with low output power. Furthermore, by enhancing the S/N ratio of the reproduction signal, a high-quality reproduction signal can be attained. That is to say, the diffraction efficiency of the ±1-order diffraction light is reduced, because the diffraction efficiency of the zero-order diffraction light of the first grating region 8 is increased. Consequently, since the influence of multiple reflection is suppressed, interference effects between the main beam and the sub-beams can be decreased. Therefore, the synergy of this effect and the effect of increasing the light utilization efficiency enhances the S/N ratio of the reproduction signal and the tracking error signal. For the same reason, an offset of the tracking error signal is also reduced.

Figure 10:
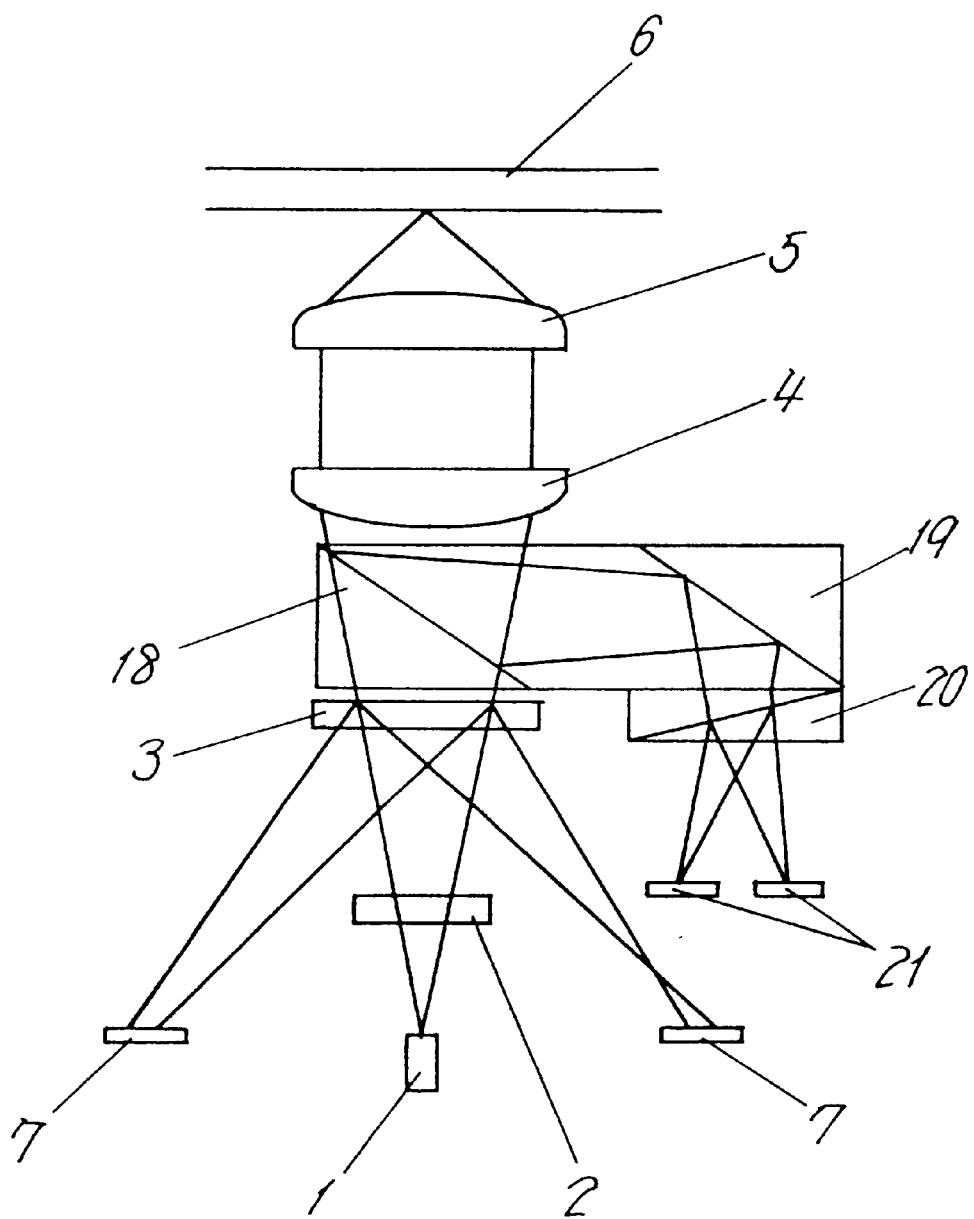
FIG. 10 shows an optical device in accordance with the first embodiment of the present invention.

Moreover, if the polarization beam splitter 18, the reflector 19, and the polarization separator 20 are integrated into one component, as shown in FIG. 10, the number of optical components can be reduced, so that the optical device can be made smaller, thinner and cheaper.

Figure 11:
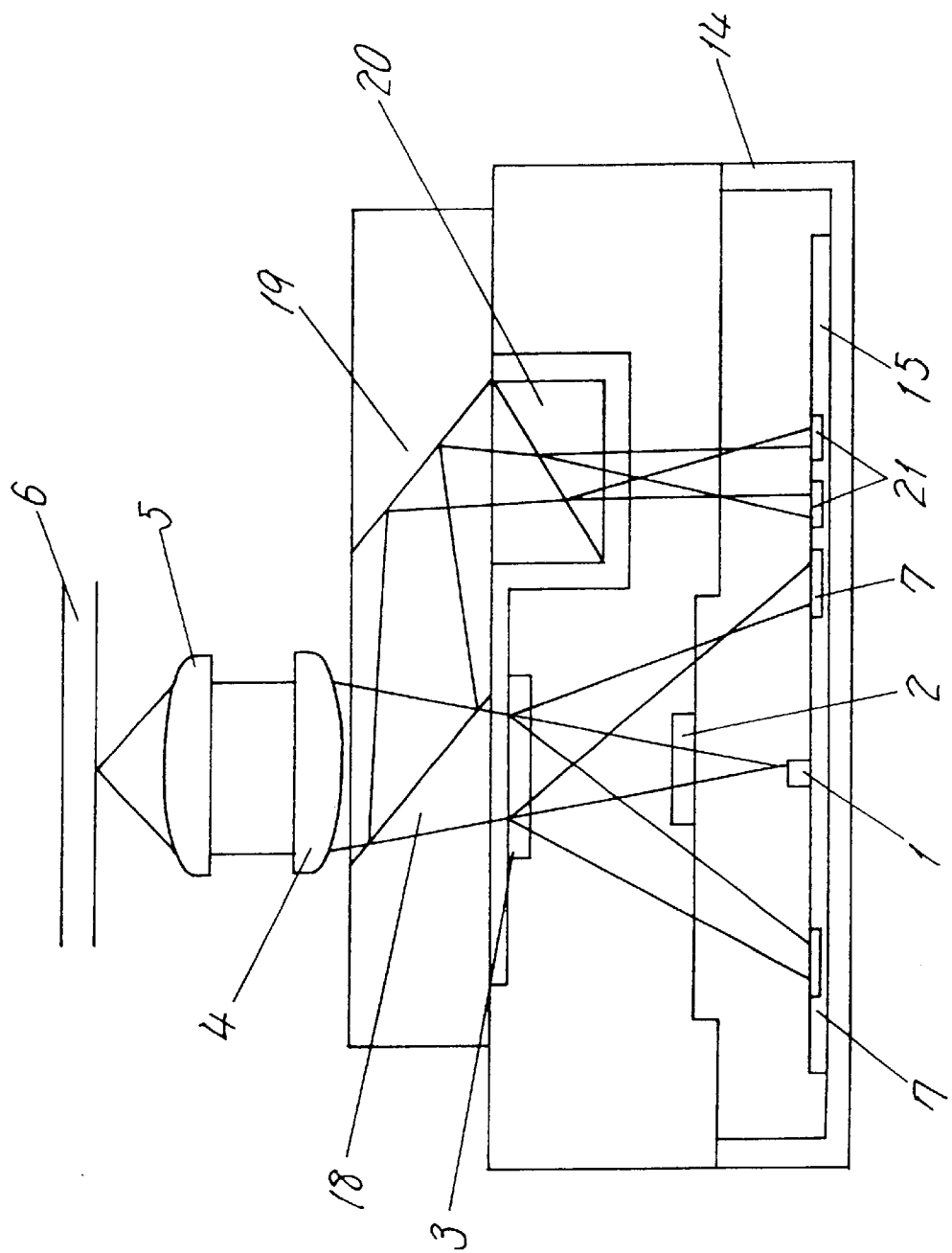
FIG. 11 shows an optical device in accordance with the first embodiment of the present invention.

If the semiconductor laser element 1, the photodetector groups 7 and the photodetector group 21 for polarization signal detection are integrated on a substrate 15, arranged in a package 14, and this package 14 is sealed with an optical component, into which the diffraction grating 2 and the holographic element 3 are integrated, and the polarization beam splitter 18, the reflector 19, and the polarization separator 20 are integrated into one component and mounted on the optical component into which the diffraction grating 2 and the holographic element 3 have been integrated, as shown in FIG. 11, then the optical device can be made smaller and thinner, while increasing the reliability of the optical device considerably.

The above-noted application examples relate only to an optical system for reproduction/recording on an information recording medium, but it should be understood that the optical device of the present invention can be applied equally to other optical information processing systems.

Second Embodiment

The following explains an optical device in a second embodiment of the present invention.

The configuration of the optical device in the second embodiment of the present invention is basically the same as that in the first embodiment, but the structure of the diffraction grating 2 in the second embodiment of the present invention differs from the one in the first embodiment in the following aspects.

Figure 12:
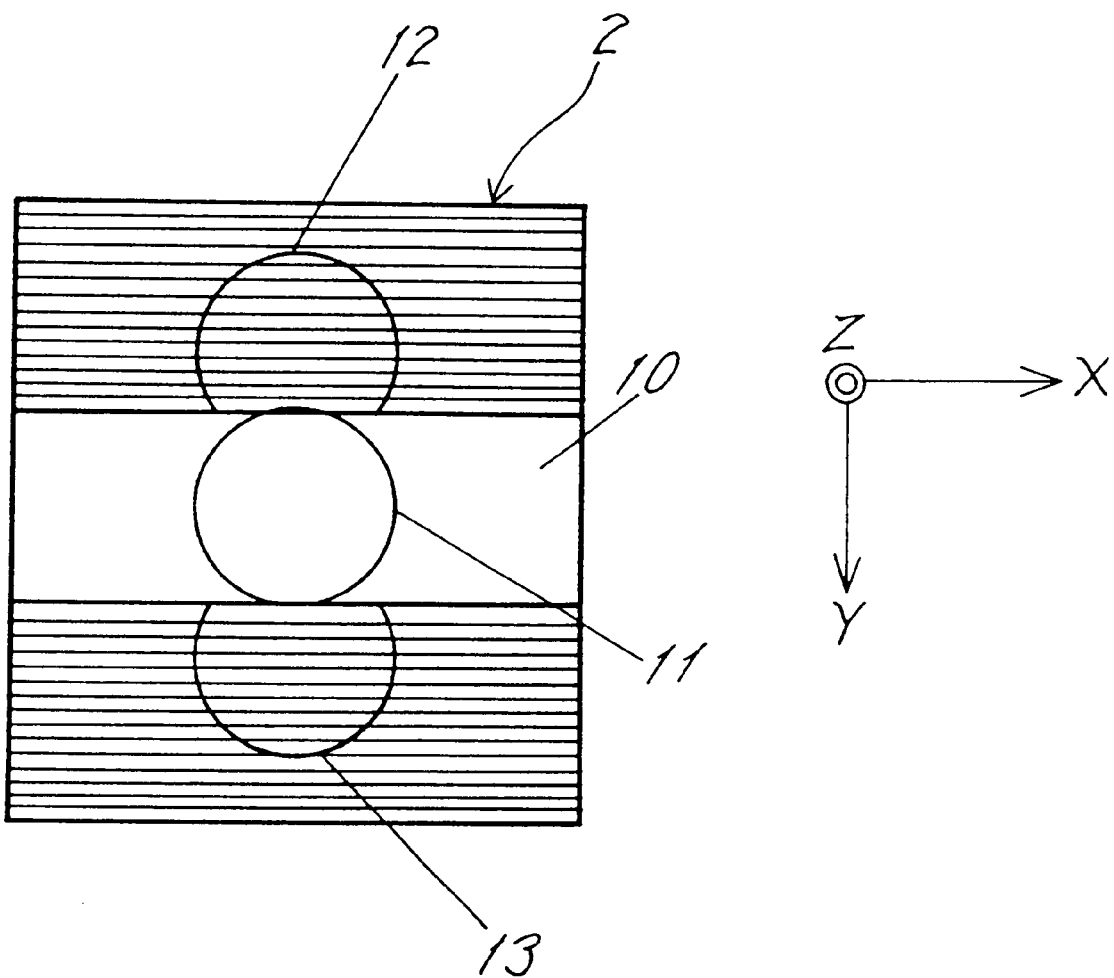
FIG. 12 shows the diffraction gratings of optical devices in accordance with a second embodiment of the present invention.

FIG. 12 is a top view of the diffraction grating 2 of the optical device in the second embodiment of the present invention. The orientations of the X-axis, the Y-axis and the Z-axis in FIG. 12 are the same as the respective orientations of the X-axis, the Y-axis and the Z-axis in FIG. 13. In FIG. 12, gratings parallel to the X-axis and having a constant pitch are formed for the diffraction grating 2. However, in the center portion of the diffraction grating 2, there is a non-grating region 10 without grating, which is stripe-shaped and formed parallel to the X-axis.

The location of the non-grating region 10 corresponds to the location where the first grating region 8 is formed in the diffraction grating 2 in the first embodiment. As has been explained for the first embodiment, the zero-order diffraction light passing the first diffraction region 8 in the diffraction grating 2 is used as the main beam, and to increase the intensity of the main beam, it is preferable that the diffraction efficiency of the zero-order diffraction light in the first grating region 8 is set to 100%. Setting the diffraction efficiency of the zero-order diffraction light in the first grating region 8 to 100% is equivalent to forming no grating at all in the first grating region 8 in the first embodiment, that is, providing the non-grating region of the second embodiment.

Thus, by forming a non-grating region in the center portion of the diffraction grating 2, it is possible to increase the intensity of the main beam optimally. And what is more, ±1-order diffraction light is not generated, because the first grating region 8 is a non-grating region. Consequently, it is possible to completely eradicate the noise components due to interferences between the main beam and the sub-beams caused by multiple reflections along light path 1 (C→B→D→A) in FIG. 16A and light path 2 (C→A→D→A) in FIG. 16B. Therefore, the S/N ratio of the reproduction signal and the tracking error signal can be enhanced considerably. Moreover, the offset of the tracking error signal can be decreased.

The various application examples explained in the first embodiment also can be used for the second embodiment. Also, the optical device in the second embodiment can be used for optical information processing systems other than systems for reproduction/recording of an information recording medium.

Moreover, the grating of the diffraction grating 2 can be tilted by a predetermined angle with respect to the stripe-shaped non-grating region 10.

Thus, providing the diffraction grating in the optical device of the present invention, which splits the light emitted from a semiconductor laser element into a plurality of beams, with a plurality of diffraction grating regions with different functions, the light utilization efficiency of the optical device can be increased vastly, so that the light amount of both the main beam and the sub-beams can be increased without increasing the light emission of the semiconductor laser element, and the S/N ratio of the main beam and the sub-beams can be enhanced.

Moreover, by making the ±1-order diffraction efficiency of the first grating region for transmitting the main beam in the optical device of the present invention lower than the ±1-order diffraction efficiency of the second grating region, multiple reflections between the information recording medium and the semiconductor laser element can be suppressed, so that the offset of the tracking error signal is reduced.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes that come within the meaning and range of equivalency of the claims are intended to be embraced therein.

What is claimed is:

1. An optical device comprising:
   a light-emitting element for irradiating light onto an information recording medium;
   a diffraction grating for splitting light emitted from said light-emitting element into a plurality of beams, the diffraction grating comprising a non-grating region;
   a focusing member for focusing the beams that have been split by the diffraction grating onto the information recording medium;
   a holographic element for splitting each of the plurality of beams after they have been reflected from the information recording medium into light for obtaining a reproduction signal for reproducing an information signal recorded on the information recording medium and light for obtaining a tracking error signal; and
   a photodetector for receiving each of the light that has been split by the holographic element and detecting the reproduction signal and the tracking error signal;
   wherein all or a portion of the light that has passed through the non-grating region enters the focusing member;
   light that has passed through the non-grating region is used as a main beam for recording/reproducing an information signal on/from the information recording medium, and
   +1-order and/or −1-order diffraction light generated in the diffraction grating is used as a sub-beam for detecting a tracking error signal.

2. The optical device of claim 1, wherein a diffraction grating depth of the diffraction grating changes stepwise with a constant period.

3. The optical device of claim 1, wherein the diffraction grating is a blazed grating.

4. The optical device of claim 1, wherein a diffraction efficiency of the diffracting grating is adjusted so as to maximize the amount of light that enters the focusing member after having passed through a region of the diffraction grating other than the non-grating region.

5. The optical device of claim 1, wherein
the entire sub-beam passes through a region of the diffraction grating other than the non-grating region.

6. The optical device of claim 1, wherein
the non-grating region is stripe-shaped; and
the grating of the diffraction grating is parallel to the non-grating region.

7. The optical device of claim 1, wherein
the non-grating region is stripe-shaped; and
the grating of the diffraction grating is tilted by a predetermined angle with respect to the non-grating region.

8. The optical device of claim 1, further comprising a circuit for amplifying an electrical signal from the photodetector.

9. The optical device of claim 1, wherein at least the light-emitting element and the photodetector are integrated in the same housing.

10. The optical device of claim 1, further comprising
a polarization member for polarizing the plurality of beams after they have been reflected from the information recording medium; and
a photodetector for receiving the plurality of beams after they have been polarized by the polarization member.

11. The optical device of claim 1, further comprising
a collimator lens between the holographic element and the focusing member,
wherein $D \geqq 2d \tan(\sin^{-1}(NA))$ is satisfied, when d is a distance from an emission plane of the light emitting element to the diffraction grating, NA is a numerical aperture of the collimator lens, and D is a width of the first grating region in a direction extending from the first grating region to the second grating region of the diffraction grating.

* * * * *